US008423309B2

(12) United States Patent
Ghosh et al.

(10) Patent No.: US 8,423,309 B2

(45) Date of Patent: Apr. 16, 2013

(54) METHOD FOR PERFORMING QUALITY CONTROL ON AN ORGANIC LIGHT EMITTING DIODE DEVICE AND A METHOD FOR DETERMINING CURRENT LEAKAGE IN AN OLED SUB-PIXEL

(75) Inventors: Amalkumar P. Ghosh, Beacon, NY (US); Ilyas I. Khayrullin, Flanders, NJ (US)

(73) Assignee: Emagin Corporation, Hopewell Junction, NY (US)

( * ) Notice: Subject to any disclaimer, the term of this patent is extended or adjusted under 35 U.S.C. 154(b) by 315 days.

(21) Appl. No.: 12/859,657

(22) Filed: Aug. 19, 2010

(65) Prior Publication Data

US 2011/0231126 A1 Sep. 22, 2011

Related U.S. Application Data

(60) Provisional application No. 61/274,721, filed on Aug. 20, 2009.

(51) Int. Cl.
*G06F 19/00* (2011.01)

(52) U.S. Cl.
USPC ................ 702/64; 345/76; 345/694; 345/211

(58) Field of Classification Search .................... 702/64; 345/76, 694, 211
See application file for complete search history.

(56) References Cited

U.S. PATENT DOCUMENTS

| | | | | |
|---|---|---|---|---|
| 2005/0001794 | A1 * | 1/2005 | Nakanishi et al. | 345/76 |
| 2007/0205968 | A1 * | 9/2007 | Chen | 345/76 |
| 2008/0084376 | A1 * | 4/2008 | Hirota et al. | 345/88 |
| 2008/0122759 | A1 * | 5/2008 | Levey | 345/78 |
| 2008/0174576 | A1 * | 7/2008 | Lee | 345/204 |
| 2008/0266214 | A1 * | 10/2008 | Naugler et al. | 345/76 |
| 2009/0174628 | A1 * | 7/2009 | Wang et al. | 345/76 |
| 2009/0207333 | A1 * | 8/2009 | No et al. | 349/54 |

* cited by examiner

*Primary Examiner* — Sujoy Kundu
*Assistant Examiner* — Haidong Zhang
(74) *Attorney, Agent, or Firm* — Epstein Drangel LLP; Robert L. Epstein

(57) ABSTRACT

A method is provided for performing quality control on an organic light emitting diode (OLED) pixel comprising three sub-pixels formed in parallel. A method is provided for determining an weighted average current leakage for three sub-pixels of an OLED pixel. The method includes selecting a total luminance level, determining a first current flowing when a first sub-pixel is energized causing the OLED pixel to emit light having 1/3 total luminance. The method includes determining a second current flowing when the first sub-pixel and a second sub-pixel are energized causing the OLED pixel to emit light having a 213 total luminance. The method includes calculating weighted average current leakage by multiplying the first current times two forming a first product, subtracting the second current from the first product forming a result, multiplying the result by two forming a second product, and dividing the second product by nine. A computer-readable medium is provided.

13 Claims, 4 Drawing Sheets

METHOD FOR PERFORMING QUALITY CONTROL ON AN ORGANIC LIGHT EMITTING DIODE DEVICE AND A METHOD FOR DETERMINING CURRENT LEAKAGE IN AN OLED SUB-PIXEL

CROSS-REFERENCE TO RELATED APPLICATIONS

This application claims the benefit of U.S. Provisional Application No. 61/274,721 filed Aug. 20, 2009, which is incorporated herein by reference.

STATEMENT REGARDING FEDERALLY SPONSORED RESEARCH OR DEVELOPMENT

Not Applicable

BACKGROUND OF THE INVENTION

1. Field of the Invention

The present invention relates to organic light emitting devices (OLEDs). In particular, the present invention relates to testing OLED pixel leakage current.

2. Description of Prior Art

An OLED device typically includes a stack of thin layers formed on a substrate. In the stack, a light-emitting layer of a luminescent organic solid, as well as adjacent semiconductor layers, are sandwiched between a cathode and an anode. The light-emitting layer may be selected from any of a multitude of fluorescent and phosphorescent organic solids. Any of the layers, and particularly the light-emitting layer, also referred to herein as the emissive layer or the organic emissive layer, may consist of multiple sublayers.

In a typical OLED, either the cathode or the anode is transparent or semitransparent. The films may be formed by evaporation, spin casting or other appropriate polymer film-forming techniques, or chemical self-assembly. Thicknesses typically range from a few monolayers to about 1 to 2,000 angstroms. Protection of an OLED against oxygen and moisture can be achieved by encapsulation of the device. The encapsulation can be obtained by means of a single thin-film layer surrounding the OLED that is situated on the substrate.

High resolution active matrix displays may include millions of pixels and sub-pixels that are individually addressed by the drive electronics. Each sub-pixel can have several semiconductor transistors and other IC components. Each OLED may correspond to a pixel or a sub-pixel, and therefore these terms are used interchangeably hereinafter. Generally, however, an OLED display consists of many OLED pixels, and each OLED pixel may have three sub-pixels associated with it, in which each sub-pixel may emit white light, which may be filtered to either red, green or blue.

In an OLED, one or more layers of semiconducting organic material may be sandwiched between two electrodes. An electric current is applied to the device, causing negatively charged electrons to move into the organic material(s) from the cathode. Positive charges, typically referred to as holes, move in from the anode. The positive and negative charges meet in the center layers (i.e., the semiconducting organic material), combine, and produce photons. The wave-length—and consequently the color—of the photons depends on the electronic properties of the organic material in which the photons are generated.

Pixel drivers can be configured as either current sources or voltage sources to control the amount of light generated by the OLEDs in an active matrix display.

The color of light emitted from the organic light emitting device can be controlled by the selection of the organic material. White light may be produced by generating blue, red and green lights simultaneously. Other individual colors, different than red, green and blue, can be also used to produce in combination a white spectrum. Specifically, the precisely color of light emitted by a particular structure can be controlled both by selection of the organic material, as well as by selection of dopants in the organic emissive layers. Alternatively, filters of red, green or blue, or other colors, may be added on top of a white light emitting pixel. In further alternatives, white light emitting OLED pixels may be used in monochromatic displays.

BRIEF SUMMARY OF THE INVENTION

The present innovation describes a method of estimating the parasitic sub-pixel leakage current during the manufacturing cycle, namely at the step after organic stack deposition, and prior to deposition of seal layers and further post processing. The invention allows preliminary screening of wafers which may potentially demonstrate a leakage current in the end of the manufacturing cycle. The described method allows reduction of the cost associated with lost of product due to presence of leakage current. Such unwanted current may result in nonconformal color coordinates.

A method is provided for performing quality control on an organic light emitting diode (OLED) pixel comprising three sub-pixels formed in parallel. The method includes determining a first total current flowing to the three sub-pixels with only a first sub-pixel energized. The first total current is equal to a sum of 1) a first current flowing to the first sub-pixel, 2) a first leakage current flowing to a second sub-pixel, and 3) a second leakage current flowing to a third sub-pixel. The first total current is sufficient to illuminate the three sub-pixels at a first luminance equal to one third of a total luminance. The total luminance is emitted by the OLED pixel when the first sub-pixel, the second sub-pixel and the third sub-pixel are simultaneously energized. The method also includes determining a second total current flowing to the three sub-pixels with only the first sub-pixel and the second sub-pixel energized. The second total current is equal to a sum of 1) the first current flowing to the first sub-pixel, 2) a second current flowing to the second sub-pixel, and 3) the second leakage current flowing to the third sub-pixel. The second total current is sufficient to illuminate the three sub-pixels at a second luminance equal to two thirds of the total luminance. The method also includes calculating an weighted average current leakage for the sub-pixels by multiplying the first total current times two and subtracting the second total current to form a result. The result is multiplied by two ninths. The method further includes determining if the OLED pixel is suitable for processing as a color display by comparing the weighted average current leakage to a predetermined level.

In the method, if the weighted average current leakage is less than the predetermined level, the OLED pixel may be processed for the color display. The processing for a color display may include adding a red filter to the first sub-pixel, adding a green filter to the second sub-pixel, and adding a blue filter to the third sub-pixel.

In the method, if the weighted average current leakage is greater than the predetermined level, the OLED pixel may be processed for a monochromatic display. The sub-pixels when energized may emit white light.

In the method, the OLED pixel may be part of an array of OLED pixels. The method may also include repeating the operations of determining the first total current, determining the second total current, and calculating the weighted average current leakage for each OLED pixel of the array. The operation of determining if the OLED pixel is suitable for processing as a color display may include determining an array-wide weighted average current leakage by averaging the weighted average current leakage for each OLED pixel of the array.

A method is provided for determining an weighted average current leakage for three sub-pixels of an organic light emitting diode (OLED) pixel. The method includes selecting a total luminance level being emitted by the OLED pixel when all of the sub-pixels of the OLED pixel are energized, and determining a first current flowing through the OLED pixel when a first sub-pixel is energized causing the OLED pixel to emit light having a first luminance. The first luminance is 113 of a total luminance of the OLED pixel. The method also includes determining a second current flowing through the OLED pixel when the first sub-pixel and a second sub-pixel are energized causing the OLED pixel to emit light having a second luminance. The second luminance is 213 of the total luminance. The method further includes calculating the weighted average current leakage by multiplying the first current times two to form a first product, and then subtracting the second current from the first product to form a result. The calculating operation further includes multiplying the result by two to form a second product, and dividing the second product by nine.

A computer-readable medium is provided having stored thereon computer-executable instructions. The computer-executable instructions cause a processor to perform a method when executed. The method is for determining an weighted average current leakage Ow) in sub-pixels of an organic light emitting diode (OLED) pixel having three sub-pixels. The method includes measuring a first current ($J^{W_r}$?) through the OLED pixel with a first sub-pixel energized to cause the OLED pixel to emit light equal to 1/3 of a total luminance (L). L is an amount of light emitted when all of the sub-pixels of the OLED pixel are energized. The method also includes measuring a second total current ($J^{m2m}$) through the OLED pixel with the first sub-pixel and a second sub-pixel energized to cause the OLED pixel to emit light equal to 213 of L. The method further includes determining $j_w$ as follows:

$$j_{w},=2/9(2\times J^{(I)}-J^{(2)}).$$

In the computer-readable medium, the method may include determining a third current used to illuminate the first sub-pixel, the second sub-pixel, and a third sub-pixel. The method may also include calculating a second weighted average current leakage based on the following equation:

$$j_w=1/3(1/3(2J^{(1)}-j^{(2)})+2/9(3J^{(1)}-J^{(3)})+1/9(2J^{(3)}-3J^{(2)})$$

The method may include averaging the weighted average current leakage and the second weighted average current leakage.

A method is provided that includes selecting a total luminance level being emitted by an array of organic light emitting diode (OLED) pixels when all ub-pixels of the array are energized. Each OLED pixel has three sub-pixels. The method also includes determining a first current flowing through the array when a first sub-pixel of each OLED pixel is energized causing the array to emit light having a first luminance. The first luminance is 113 of the total luminance. The method further includes determining a second current flowing through the array when the first sub-pixel and a second sub-pixel of each OLED pixel are energized causing the array to emit light having a second luminance. The second luminance is 213 of the total luminance. The method includes calculating an weighted average current leakage between sub-pixels by multiplying the first current times two to form a first product, then subtracting the second current from the first product to form a result, then multiplying the result by two to form a second product, and dividing the second product by nine.

The method may further include determining if the array is suitable for processing as a color display by comparing the weighted average current leakage to a predetermined level. If the weighted average current leakage is less than the predetermined level, the method may include processing the array for a color display. If the weighted average current leakage is equal to or greater than the predetermined level, the method may include processing the array for a monochromatic display.

DETAILED DESCRIPTION OF THE INVENTION

Figure 1:
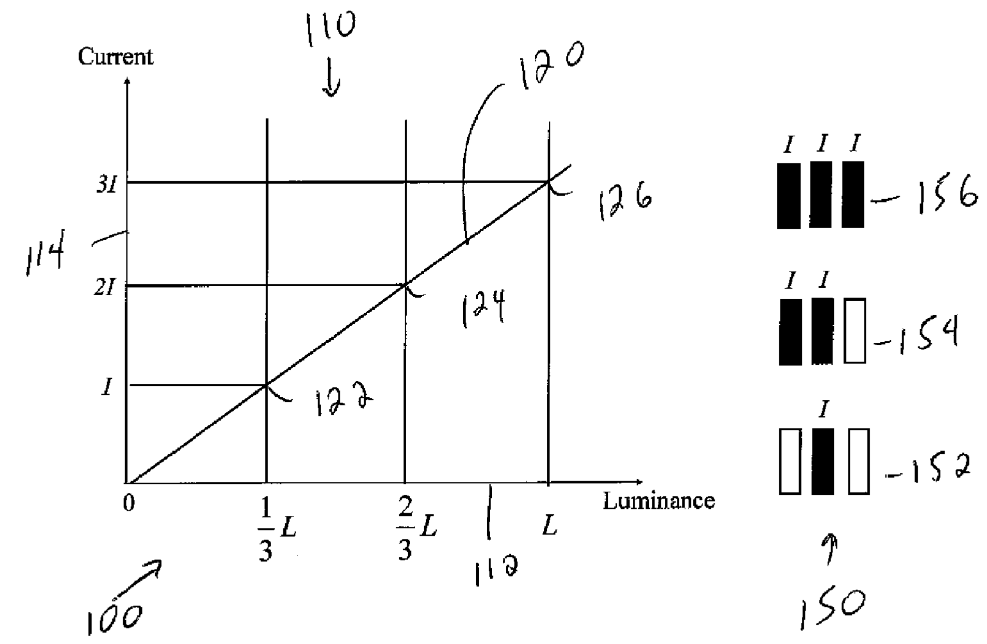
FIG. 1 is an exemplary electrical current-luminance graph for an idealized OLED device with no leakage current.

The present innovation may be applied to OLED displays of any size, and in particular to displays where colors are attained by placing color filter materials on top of white sib-pixels by means of spin coating and photolithography patterning or other means. The display may be evaluated according to the present innovation at the manufacturing stage immediately following organic stack deposition. If the weighted average current leakage in the pixels of an array exceeds a threshold amount, the array may be diverted to a monochromatic white display in order to avoid color bleeding that may render the pixel array less useful or ineffective. However, if the weighted average current leakage in the pixels of an array is less than the threshold amount, the array may be processed by adding color filters to obtain a color display.

The equations presented herein determine the leakage in one OLED pixel having three sub-pixels, but the method is likely to be performed on an array level. Technically, if one has an OLED device with only three big sub-pixels with well reachable contacts, the method is applicable to a single OLED device. However, it is usually difficult to get measuring probes to the individual sub-pixels (that are on the order of micrometers) in a display containing thousands or millions of sub-pixels. In addition, one must turn on only those particular three sub-pixels out of millions, which is also difficult, unless one designs special circuitry that can address individual sub-pixels. The present method is useful as applied to arrays of OLED pixels in a display to measure leakage current as an average from many sub-pixels of the display. Thus, the present method may preferably be performed on an array level, in which sub-pixels are turned on by group.

If parasitic sub-pixel leakage current is absent or minuscule and does not affect performance, in particular if it does not shift color coordinates, then the display may be processed as a color display by adding color filters. However, if sub-pixel leakage current becomes strong and thus affects performance, in particular by shifting color coordinates, then the display can be subsequently processed as a monochrome white display. As a monochrome white display, the leakage current will not shift color coordinates since all sub-pixels are identical. In a monochrome display, all of the sub-pixels turn on equally when the pixel is activated. In a monochrome display color shifting is not an issue. To make an image on the display, the current must vary in each sub-pixel differently to emit light from black, through all shades of gray, to white level. While the shades change, the color coordinates in a monochromatic display do not shift. Shifting of color coordinates becomes an issue when you have three neighboring sub-pixels emitting three different colors. Then a small leakage current into a neighbor sub-pixel that should be inactive may bring in some unwanted light from the otherwise inactive subpixel and shift the color coordinates of the output away from the color coordinate expected from the energized, active subpixel.

The present innovation assists in making the decision to change post organic layer deposition processing avenue from color to monochrome without losing the substrate. The present innovation also helps in quality control by allowing for removal of a display with severe parasitic leakage current from continued manufacturing, thereby avoiding expensive post processing.

The method is based on the following steps. First, take three measurements in active mode. The first measurement is with only one array of sub-pixels turned on, the second measurement is with two arrays of sub-pixels turned on, and the third measurement is with all sub-pixels turned on. Then, using a single equation discussed below, calculate an average leakage current for each sub-pixel. The current measurements are made at three distinct luminance levels, in recognition of the generally linear relationship between current and luminance in OLED pixels. Therefore, during the measurements, ratios of 1/3L, 2/3L and L for three luminance levels are maintained. In this manner, the proposed method can be used to measure leakage current.

FIG. 1 illustrates an electrical current-luminance graph for an ideal OLED device with no leakage current through any sub-pixel which is not turned on, and where "I" is the current passing through an active sub-pixel. Chart 100 includes current-luminance graph 110 and schematic 150. Current-luminance graph 110 includes x-axis 112 indicating a luminance output by a pixel having three sub-pixels. The gradations on x-axis 112 are 1/3 L, 2/3 L and L, where L corresponds to the luminance output when each sub-pixel is illuminated at current I, and therefore the total current in the pixel is 31.

Luminance L is an arbitrary percentage of a maximum output from all three sub-pixels when they are turned on. For instance, one may say set L to 300 cd/m2 for the situation when all three sub-pixels are turned on. This level can be attained by simply cranking the total driving current up. In this case, the other two measurements would be performed at the levels 200 and 100 cd/m2, respectively. In another example, one may start with L equal to 600 cd/m2 by cranking the total current even further up. Then in this case, the other two measurements would be performed at the levels 400 and 200 cd/m2, respectively. The absolute level of luminance L may be irrelevant, while the ratios of 1/3L, 2/3L and L, (as applicable in the three sub-pixel situation) are significant when combined with a linearity between the driving current and the luminance.

Current-luminance graph 110 includes y-axis 114 indicating a current flowing through a pixel having three sub-pixels. The gradations on y-axis 114 are I, 21 and 31, where I corresponds to the current flowing through a sub-pixel. Schematic 150 illustrates three modes of operation of the pixel: 1) all sub-pixels illuminated (mode 156); 2) two sub-pixels illuminated and one sub-pixel not illuminated (mode 154); and 3) one sub-pixel illuminated and two sub-pixels not illuminated (mode 152). Schematic 150 aligns with current-luminance graph 110 with mode 156 having all sub-pixels illuminated and current 3I, which intersects linear characteristic 120 at point 126, corresponding to luminance L. Likewise, mode 154 having two sub-pixels illuminated and one sub-pixel not illuminated aligns with current 21, which intersects linear characteristic 120 at point 124, corresponding to luminance 2/3 L. Finally, mode 152 having one sub-pixel illuminated and two sub-pixels not illuminated aligns with current I, which intersects linear characteristic 120 at point 122, corresponding to luminance 1/3 L.

Figure 2:
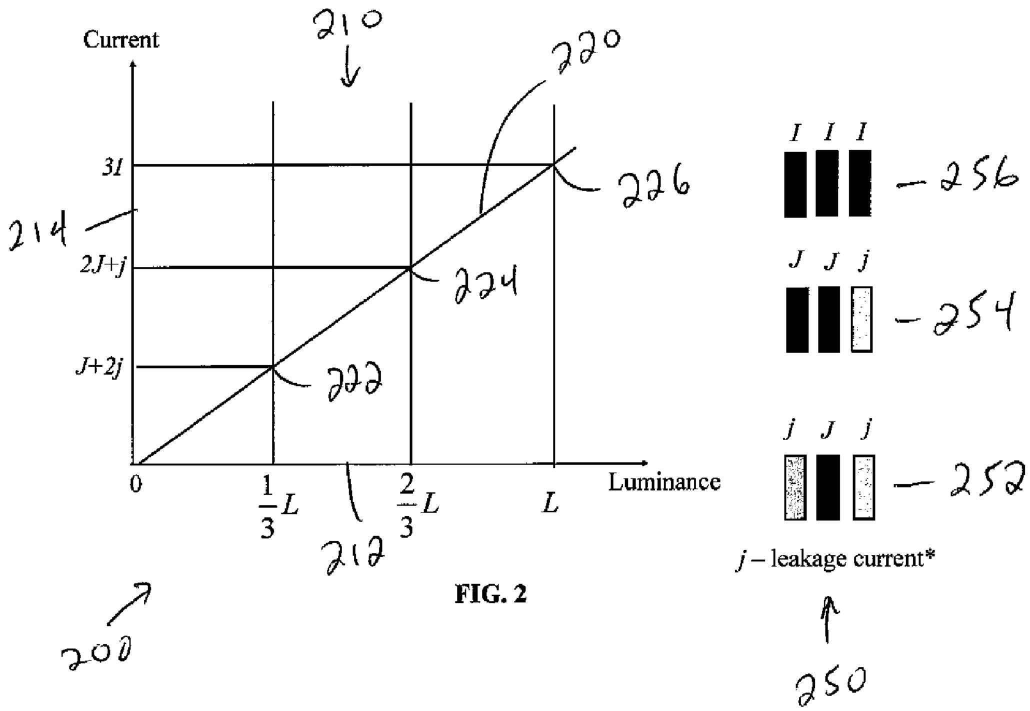
FIG. 2 is an exemplary electrical current-luminance graph for an OLED device having leakage current when one or two sub-pixels are turned off.

FIG. 2 illustrates an electrical current-luminance graph for OLED device where one or two sub-pixels are turned off but yet contribute to the overall luminance due to the leakage current j. Main current I through an active sub-pixel is reduced now to J by measure of j. Chart 200 includes current-luminance graph 210 and schematic 250. Current-luminance graph 210 includes x-axis 212 indicating a luminance output by a pixel having three sub-pixels. The gradations on x-axis 212 are 1/3 L, 2/3 L and L, where L corresponds to the luminance output when each sub-pixel is illuminated at current I, and therefore the total current in the pixel is 3I. Current-luminance graph 210 includes y-axis 214 indicating a current flowing through a pixel having three sub-pixels. The gradations on y-axis 214 are I, 2I and 31, where I corresponds to the current flowing through a sub-pixel. Schematic 250 illustrates three modes of operation of the pixel: 1) all sub-pixels illuminated (mode 256); 2) two sub-pixels illuminated and one sub-pixel illuminated only by leakage current (mode 254); and 3) one sub-pixel illuminated and two sub-pixels illuminated only by leakage current (mode 252). Schematic 250 aligns with current-luminance graph 210 with mode 256 having all sub-pixels illuminated and current 3I, which intersects linear characteristic 220 at point 226, corresponding to luminance L. Likewise, mode 254 having two sub-pixels illuminated and one sub-pixel illuminated only by leakage current aligns with current 2J+j, which intersects linear characteristic 220 at point 224, corresponding to luminance 2/3 L. Finally, mode 252 having one sub-pixel illuminated and two sub-pixels illuminateld only by leakage current aligns with current J+2j, which intersects linear characteristic 220 at point 222, corresponding to luminance 1/3 L. The following equation is used to estimate the average leakage current:

$$j_{avrg} = \frac{2}{9}(2J_{total}^{(1)} - J_{total}^{(2)})$$

This equation is derived from the following equations. Although it is assumed that the luminous efficiency of the organic stack remains the same in the 1/3L, 2/3L, and L measurements, the leakage current in the more generic case of slightly different efficacies at three measured points can also be calculated using this equation. The derivation of this equation follows, in which the terms are defined as follows:

$J_{total}^{(1)}$—a first total current flowing through the OLED pixel array with one sub-pixel of each OLED pixel energized, also referred to herein as $J^{(1)}$ $J_{total}^{(2)}$—a second total current flowing through the OLED pixel array with two sub-pixels of each OLED pixel energized, also referred to herein as $J^{(2)}$ $J_{total}^{(3)}$—a third total current flowing through the OLED pixel array with three sub-pixels of each OLED pixel energized, also referred to herein as $J^{(3)}$ j—a leakage current in a sub-pixel J—a current flowing through an energized sub-pixel in a pixel with at least one sub-pixel not being energized, and with some leakage $j_{avrg}$—an average leakage current for the plurality of sub-pixels within pixels of an array, also referred to herein as $j_w$ When all three sub-pixels are turned on to produce luminance L, one can assume that leakage current between individual sub-pixels are mutually negated. The total current through the array of sub-pixels for this case is (as shown in FIGS. 1 and 2):

$$J_{total}^{(3)}=3J \quad (1)$$

When only two sub-pixels are turned on to produce luminance 2/3L and in the absence of leakage current (in the ideal case shown in FIG. 1), the total current will be 21. However, when leakage current is present (FIG. 2), the total current through the array of sub-pixels can be calculated as:

$$J_{total}^{(2)}=2=2J+j \quad (2)$$

When only one sub-pixel is turned on to produce luminance 1/3L, the total current through the display can be calculated as:

$$J_{total}^{(1)}=J+2j \quad (3)$$

Combining equations (2) and (3) and sequentially substituting terms as shown below:

$$J=J_{total}^{(1)}-2j \quad (4)$$

$$J_{total}^{(2)}=)2(J_{total}^{(1)}-2j)+j \quad (5)$$

$$J_{total}^{(2)}=2J_{total}^{(1)}-4j+j \quad (6)$$

$$J_{total}^{(2)}=2J_{total}^{(1)}-3j \quad (7)$$

$$3j=2J_{total}^{(1)}-J_{total}^{(2)} \quad (8)$$

One may arrive at:

$$j=\frac{1}{3}(2J_{total}^{(1)}-J_{total}^{(2)}). \quad (9)$$

Combining equations (1) and (2) and sequentially substituting terms as shown below:

$$\frac{2}{3}J_{total}^{(3)}=J_{total}^{(2)}=2J+j \quad (10)$$

$$J=J_{total}^{(1)}-2j \quad (11)$$

$$\frac{2}{3}J_{total}^{(3)}=2(J_{total}^{(1)}-2j)+j \quad (12)$$

$$\frac{2}{3}J_{total}^{(3)}=2J_{total}^{(1)}-3j \quad (13)$$

$$3j=2J_{total}^{(1)}-\frac{2}{3}J_{total}^{(3)} \quad (14)$$

$$3j=\frac{2}{3}(3J_{total}^{(1)}-J_{total}^{(3)}) \quad (15)$$

One may arrive at:

$$j=\frac{2}{9}(3J_{total}^{(1)}-J_{total}^{(3)}) \quad (16)$$

Combining equations (1) and (3) and sequentially substituting terms as shown below:

$$\frac{1}{3}J_{total}^{(3)}=J_{total}^{(1)}=J+2j \quad (17)$$

$$J=\frac{1}{3}J_{total}^{(3)}-2j \quad (18)$$

$$J_{total}^{(2)}=2\left(\frac{1}{3}J_{total}^{(3)}-2j\right)+j \quad (19)$$

$$J_{total}^{(2)}=\frac{2}{3}J_{total}^{(3)}-4j+j \quad (20)$$

$$3j=\frac{2}{3}J_{total}^{(3)}-J_{total}^{(2)} \quad (21)$$

$$3j=\frac{1}{3}(2J_{total}^{(3)}-3J_{total}^{(2)} \quad (22)$$

One may arrive at:

$$j=\frac{1}{9}(2J_{total}^{(3)}-3J_{total}^{(2)}) \quad (23)$$

Averaging out equations (9), (16) and (23):

$$j_{avrg}=\frac{1}{3}\left[\frac{1}{3}(2J_{total}^{(1)}-J_{total}^{(2)})+\frac{2}{9}(3J_{total}^{(1)}-J_{total}^{(3)})+\frac{1}{9}(2J_{total}^{(3)}-3J_{total}^{(2)})\right] \quad (24)$$

Finally, one may obtain a simple equation that will allow for the estimation of average leakage current:

$$j_{avrg}=\frac{2}{9}(2J_{total}^{(1)}-J_{total}^{(2)}) \quad (25)$$

As is apparent from the equation, only two measurements are necessary, along with measurements of a total luminance. One limitation of the invention may be the need to drive a microdisplay in active mode. To energize one array of sub-pixels, an active matrix display may need to be driven in active matrix mode, and therefore the sub pixels must be segregated electronically via active matrix driving circuitry. In such a situation, circuitry may need to be designed to address not only individual sub-pixel arrays within individual display, but also to address individual displays among many on a common substrate. Such a substrate can be a silicon wafer, or another substrate generally used for OLED displays, which may be technically challenging.

Figure 3:
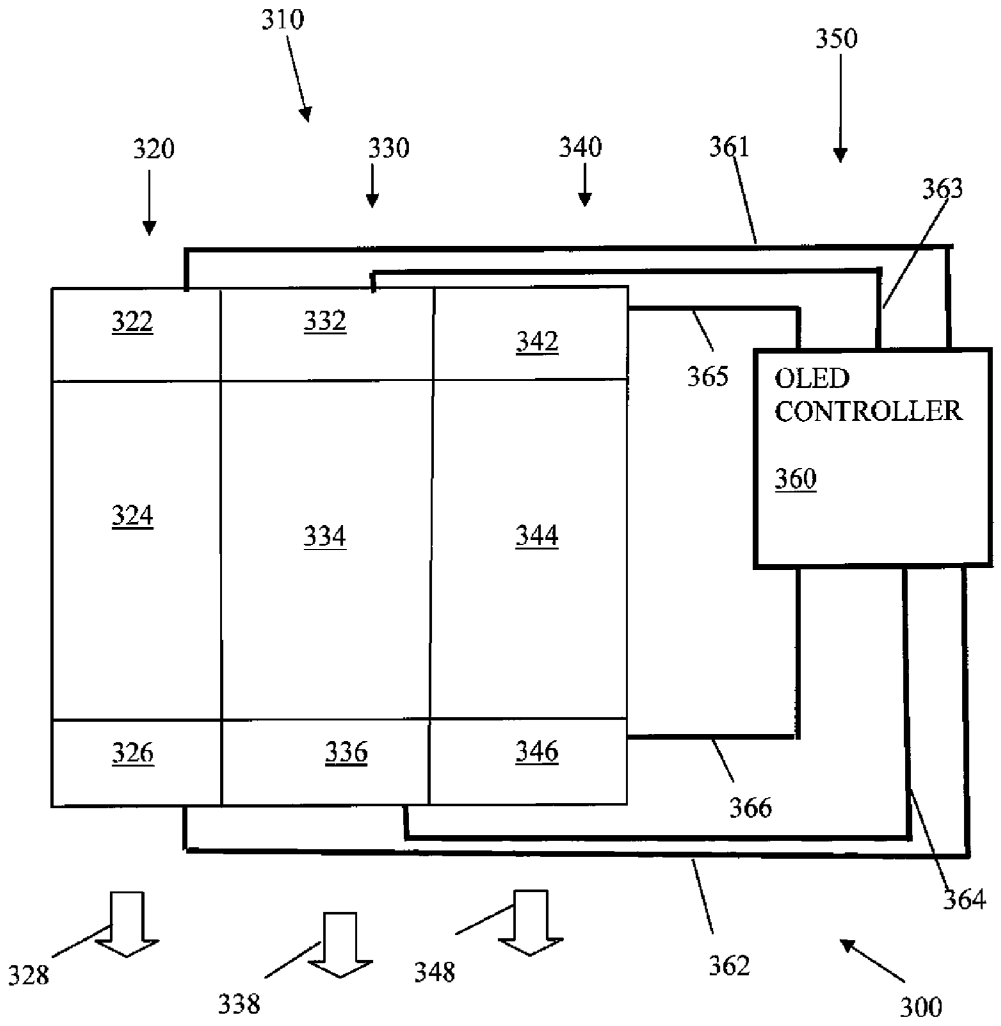
FIG. 3 is a cross-sectional schematic view of an OLED apparatus including an OLED pixel having three sub-pixels and an OLED controller.

FIG. 3 illustrates pixel system 300 including OLED pixel 310 and circuitry 350. OLED pixel 310 includes sub-pixels 320, 330, 340. Sub-pixels 320, 330, 340 may correspond to red, green and/or blue sub-pixels. Alternatively, sub-pixels 320, 330, 340 may all correspond to white sub-pixels. Sub-pixel 320 may include cathode 322, emissive layer 324 and anode to 326. Likewise, sub-pixel 330 may include cathode 332, emissive layer 334 and anode 336. Similarly, sub-pixel 340 may include cathode 342, emissive layer 344 and anode 346. Each of cathodes 322, 332 and 342 may be an anode, and each of anodes 326, 336 to 346 maybe a cathode. Sub-pixel 320 may emit light 328 in the direction shown, or alternatively emit light in the opposite, or any other direction. Likewise sub-pixels 330 and 340 may emit light 328 and 348, respectively, in the direction shown or in any other direction. Light 328, 338, 348 may be red, green, blue, white, or any appropriate combination of these colors. Circuitry 350 includes OLED controller 360 and wires 361, 363, 365 leading from OLED controller 360 to cathodes 322, 332, 342. Circuitry 350 also includes wires 362, 364, 366 leading from OLED controller 360 to anodes 326, 336, 346. Sub-pixels 320, 330, 340 may include additional layers, including sublayers within or adjacent to the respective emissive layers. Additionally, OLED pixel 310 may include only two sub-pixels, or may include four or more sub-pixels.

When OLED controller 360 operates to turn on any one of sub-pixels 320, 330, 340, leakage current may exist causing an adjacent sub-pixel to emit light. For instance, when OLED controller 360 activates sub-pixel 320, some current may flow through the emissive layer 234 of adjacent sub pixel is 330 causing emissive layer 334 to emit light. Likewise, activating sub-pixel 330 may cause current leakage into one or both of sub-pixels 320 and 40. Similarly, activating sub-pixel 340 may cause leakage of current in to sub-pixel 330. The problem of leakage current may also exist in pixels having two sub-pixels, or four or more sub-pixels.

Figure 4:
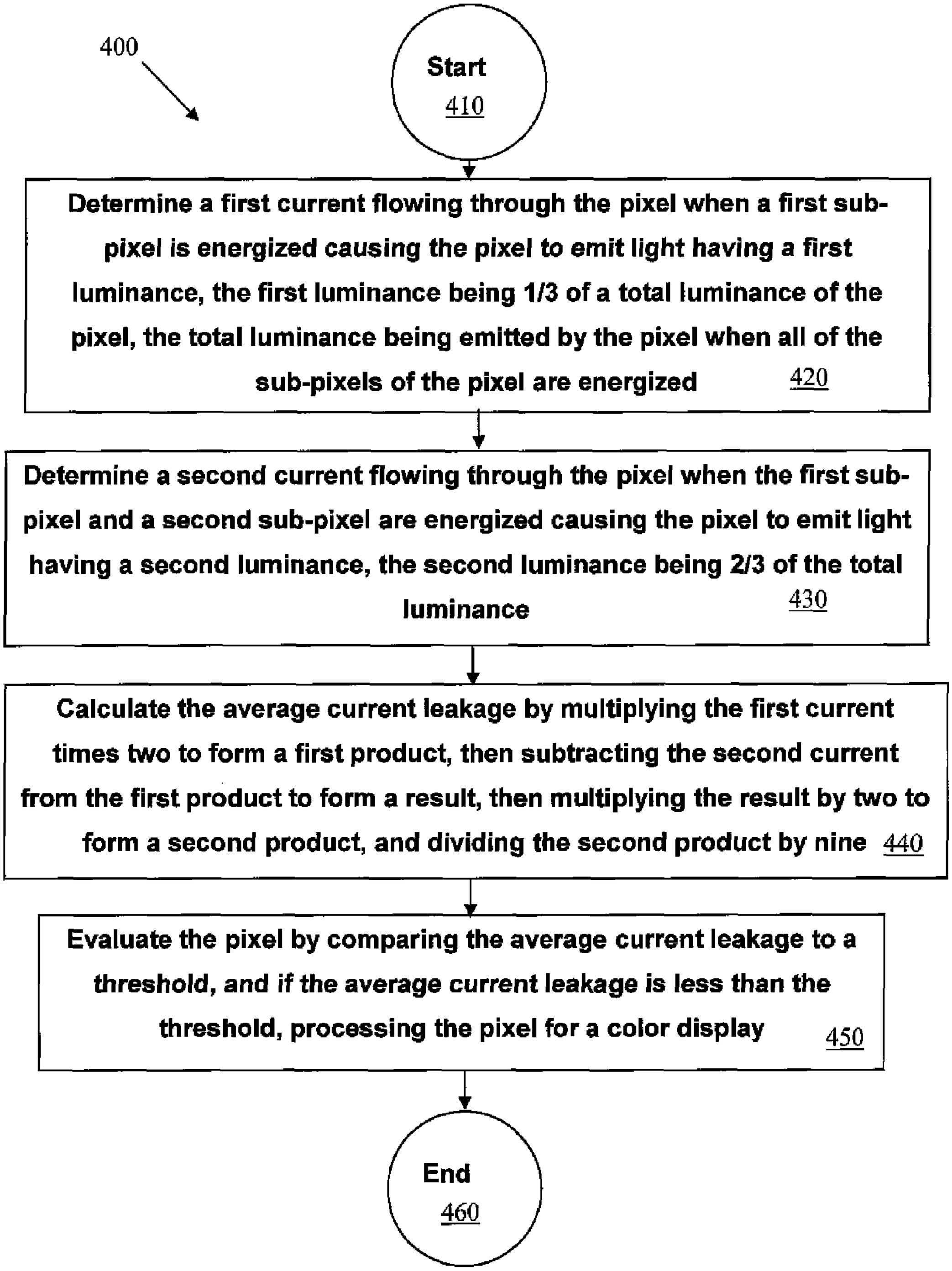
FIG. 4 illustrates a method according to an exemplary embodiment.

FIG. 4 illustrates method 400 according to an exemplary embodiment. Method 400 starts at start circle 410 and proceeds to operation 420, which indicates to determine a first current flowing through the pixel when a first sub-pixel is energized causing the pixel to emit light having a first luminance, the first luminance being 113 of a total luminance of the pixel, the total luminance being emitted by the pixel when all of the sub-pixels of the pixel are energized. From operation 420 the flow in method 400 proceeds to operation 430, which indicates to determine a second current flowing through the pixel when the first sub-pixel and a second sub-pixel are energized causing the pixel to emit light having a second luminance, the second luminance being 2/3 of the total luminance. From operation 430 the flow in method 400 proceeds to operation 440, which indicates to calculate the weighted average current leakage by multiplying the first current times two to form a first product, then subtracting the second current from the first product to form a result, then multiplying the result by two to form a second product, and dividing the second product by nine. From operation 440 the flow in method 400 proceeds to operation 450, which indicates to evaluate the pixel by comparing the weighted average current leakage to a threshold, and if the weighted average current leakage is less than the threshold, processing the pixel for a color display. From operation 450 the flow in method 400 proceeds to end circle 480.

The method of FIG. 4 may be performed for determining an average leakage current without performing operation 450. The method may be performed with or without this step during a manufacture process for determining the particular manufacturing plan for the particular device, for adjusting the manufacturing process for subsequent devices, or at the end of a manufacture process for quality control purposes. Additionally, the exemplary method may be performed during or after a manufacturing process for evaluating an OLED design.

Figure 5:
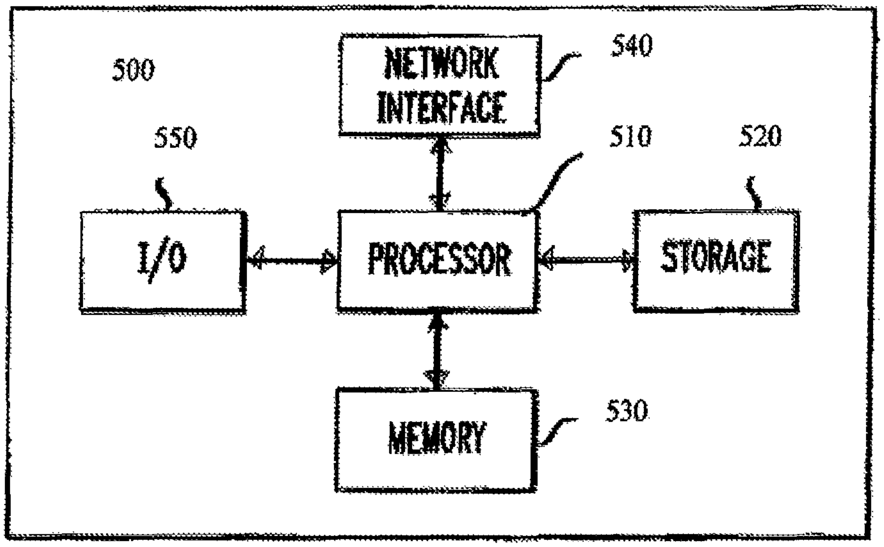
FIG. 5 illustrates a computer system according to an exemplary embodiment.

FIG. 5 illustrates a computer system according to an exemplary embodiment. Computer 500 can, for example, operate OLED controller 360, or may be OLED controller 360. Additionally, computer 500 can perform the steps described above (e.g., with respect to FIG. 4). Computer 500 contains processor 510 which controls the operation of computer 500 by executing computer program instructions which define such operation, and which may be stored on a computer-readable recording medium. The computer program instructions may be stored in storage 520 (e.g., a magnetic disk, a database) and loaded into memory 530 when execution of the computer program instructions is desired. Thus, the computer operation will be defined by computer program instructions stored in memory 530 and/or storage 520 and computer 500 will be controlled by processor 510 executing the computer program instructions. Computer 500 also includes one or more network interfaces 540 for communicating with other devices, for example other computers, servers, or websites. Network interface 540 may, for example, be a local network, a wireless network, an intranet, or the Internet. Computer 500 also includes input/output 550, which represents devices which allow for user interaction with the computer 500 (e.g., display, keyboard, mouse, speakers, buttons, webcams, etc.). One skilled in the art will recognize that an implementation of an actual computer will contain other components as well, and that FIG. 5 is a high level representation of some of the components of such a computer for illustrative purposes.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

We claim:

1. A method for performing quality control on an organic light emitting diode (OLED) pixel comprising three sub-pixels formed in parallel, the method being performed on a computer having a processor and a non-transitory computer-readable medium having computer-executable instructions stored thereon, wherein the processor performs the method in accordance with the stored instructions, comprising:

determining a first total current flowing to the three sub-pixels with only a first sub-pixel energized, the first total current being equal to a sum of a first current flowing to the first sub-pixel, a first leakage current flowing to a second sub-pixel and a second leakage current flowing to a third sub-pixel, the first total current being sufficient to illuminate the three sub-pixels at a first luminance equal to one third of a total luminance, the total luminance being emitted by the OLED pixel when the first sub-pixel, the second sub-pixel and the third sub-pixel are energized;

determining a second total current flowing to the three sub-pixels with only the first sub-pixel and the second sub-pixel energized, the second total current being equal to a sum of the first current flowing to the first sub-pixel, a second current flowing to the second sub-pixel and the second leakage current flowing to the third sub-pixel, the second total current being sufficient to illuminate the three sub-pixels at a second luminance equal to two thirds of the total luminance;

calculating a weighted average current leakage for the sub-pixels by multiplying the first total current times two and subtracting the second total current to form a result, and multiplying the result by two ninths; and determining if the OLED pixel is suitable for processing as a color display by comparing the weighted average current leakage to a predetermined level.

2. The method of claim 1, wherein if the weighted average current leakage is less than the predetermined level, processing the OLED pixel for the color display.

3. The method of claim 2, wherein the processing for the color display comprises adding a red filter to the first sub-pixel, adding a green filter to the second sub-pixel, and adding a blue filter to the third sub-pixel.

4. The method of claim 1, wherein if the weighted average current leakage is greater than the predetermined level, processing the OLED pixel for a monochromatic display.

5. The method of claim 1, wherein the sub-pixels when energized emit white light.

6. The method of claim 1, wherein:

the OLED pixel is part of an array of OLED pixels;

and further comprising repeating the operations of determining the first total current, determining the second total current, and calculating the weighted average current leakage for each OLEO pixel of the array; and wherein the operation of determining if the OLED pixel is suitable for processing as a color display comprises determining an array-wide weighted average current leakage by averaging the weighted average current leakage for each OLED pixel of the array.

7. A method for determining a weighted average current leakage for three sub-pixels of an organic light emitting diode (OLED) pixel, the method being performed on a computer having a processor and a non-transitory computer-readable medium having computer-executable instructions stored thereon, wherein the processor performs the method in accordance with the stored instructions, the method comprising:

selecting a total luminance level being emitted by the OLED pixel when all of the sub-pixels of the OLED pixel are energized;

determining a first current flowing through the OLED pixel when a first sub-pixel is energized causing the OLED pixel to emit light having a first luminance, the first luminance being 1/3 of the total luminance of the OLED pixel;

determining a second current flowing through the OLED pixel when the first subpixel and a second sub-pixel are energized causing the OLED pixel to emit light having a second luminance, the second luminance being 2/3 of the total luminance; and calculating the weighted average current leakage by multiplying the first current times two to form a first product, that subtracting the second current from the first product to form a result, then multiplying the result by two to form a second product, and dividing the second product by nine.

8. A non-transitory computer-readable medium having stored thereon computer-executable instructions, the computer-executable instructions causing a processor to perform a method when executed, the method for determining a weighted average current leakage ($j_w$) in sub-pixels of an organic light emitting diode (OLED) pixel having three sub-pixels, the method comprising;

measuring a first current ($J_{(1)}$) through the OLED pixel with a first sub-pixel energized to cause the OLED pixel to emit light equal to 1/3 of a total luminance (L), L being an amount of light emitted when all of the sub-pixels of the OLED pixel are energized;

measuring a second total current ($J_{(2)}$) through the OLED pixel with the first subpixel and a second sub-pixel energized to cause the OLED pixel to emit light equal to 2/3 of L; and determining $j_w$ as follows:

$$j_w=2/9(2/9(2\times J^{(1)})-J^{(2)}).$$

9. The non-transitory computer-readable medium of claim 8, wherein the method further comprises:

determining a third current used to illuminate the first sub-pixel, the second subpixel, and a third sub-pixel;

calculating a second weighted average current leakage based on the following equation:

$$j_w=1/3(1/3(2J^{(1)}-J^{(2)})+2/9(3J^{(1)}-J^{(3)})+1/9(2J^{(3)}-3J^{(2)})$$

and averaging the weighted average current leakage and the second weighted average current leakage.

10. A method performed on a computer having a processor and a non-transitory computer-readable medium having computer-executable instructions stored thereon, wherein the processor performs the method in accordance with the stored instructions, comprising;

selecting a total luminance level being emitted by an array of organic light emitting diode (OLED) pixels when all sub-pixels of the array are energized, each OLED pixel having three sub-pixels;

determining a first current flowing through the array when a first sub-pixel of each OLED pixel is energized causing the array to emit light having a first luminance, the first luminance being 1/3 of the total luminance;

determining a second current flowing through the array when the first sub-pixel and a second sub-pixel of each OLED pixel are energized causing the array to emit light having a second luminance, the second luminance being 2/3 of the total luminance; and calculating a weighted average current leakage between sub-pixels by multiplying the first current times two to form a first product, then subtracting the second current from the first product to form a result, then multiplying the result by two to form a second product, and dividing the second product by nine.

11. The method of claim 10, further comprising determining if the array is suitable for processing as a color display by comparing the weighted average current leakage to a predetermined level.

12. The method of claim 11, wherein if the weighted average current leakage is less than the predetermined level, processing the array for a color display.

13. The method of claim 11, wherein if the weighted average current leakage is equal to or greater than the predetermined level, processing the array for a monochromatic display.

* * * * *